United States Patent [19]

Fuller et al.

[11] Patent Number: 6,007,931
[45] Date of Patent: Dec. 28, 1999

[54] MASS AND HEAT RECOVERY SYSTEM FOR A FUEL CELL POWER PLANT

[75] Inventors: Thomas F. Fuller, Glastonbury; Paul R. Margiott, South Windsor; Leslie L. Van Dine, Manchester, all of Conn.

[73] Assignee: International Fuel Cells Corporation, South Windsor, Conn.

[21] Appl. No.: 09/103,908

[22] Filed: Jun. 24, 1998

[51] Int. Cl.⁶ .............................. H01M 8/00; H01M 8/04; H01M 8/18; H01M 2/00
[52] U.S. Cl. .................................... 429/13; 17/20; 17/26; 17/34
[58] Field of Search .................................. 429/13, 17, 20, 429/26, 34

[56] References Cited

U.S. PATENT DOCUMENTS

| | | | |
|---|---|---|---|
| 5,316,870 | 5/1994 | Ohga | 429/26 X |
| 5,344,721 | 9/1994 | Sonai et al. | 429/26 X |
| 5,401,589 | 3/1995 | Palmer et al. | 429/13 |
| 5,503,944 | 4/1996 | Meyer et al. | 429/13 |
| 5,542,968 | 8/1996 | Belding et al. | 96/125 |
| 5,573,866 | 11/1996 | Van Dine et al. | 429/13 |
| 5,660,048 | 8/1997 | Belding et al. | 62/94 |
| 5,851,689 | 12/1998 | Chen | 429/13 |

OTHER PUBLICATIONS

P.C.T. International Application No. WO 99/05741 Published on Feb. 4, 1999.

Printed article entitled "Feasability Study of SPE Fuel Cell Power Plants for Automotive Applications", written on Nov. 17, 1981 by General Electric Corporation, Direct Energy Conservation Programs, 50 Fordham Rd., Wilmington, MA 01887, (See, Figs. 1, 16, 28, and pp. 58–60.)

Printed article entitled "Making Fuel Cells Cheaper, Lighter and Smaller", by Ron DuBose in a publication of the Emprise Corporation of Marietta GA 30067 Which publication is entitled "Electric & Hybrid Vehicle Technology '97", was published in 1997, and has no page or periodical numbers. (No Month).

*Primary Examiner*—Donald R. Valentine
*Attorney, Agent, or Firm*—Malcolm J. Chisholm, Jr.

[57] ABSTRACT

A mass and heat recovery system for a fuel cell power plant includes at least one fuel cell for producing electrical energy, hydrocarbon fuel processing components for producing a hydrogen rich reducing fluid for the fuel cell, and a direct mass and heat transfer device for recovering mass and heat such as water vapor leaving the plant. The fuel processing components include an auxiliary burner that provides heat to generate steam and a reformer that receives the steam mixed with a hydrocarbon fuel along with a small amount of air and converts the mixture to a hydrogen rich stream appropriate for supplying hydrogen to the anode electrode. The direct mass and heat transfer device passes a process oxidant stream upstream of the plant in mass transfer relationship with a plant exhaust stream that includes both a cathode exhaust stream and an anode exhaust stream wherein the anode exhaust stream has first been burned in the auxiliary burner so that mass and heat such as water vapor in the plant exhaust stream transfer directly through a mass transfer medium of the device to the process oxidant stream entering the plant. The device includes a separator housing for supporting the transfer medium and for preventing bulk mixing of the streams. An exemplary transfer medium such as a liquid water portion of a water saturated polyflourosulfonic ionomer selectively sorbs a fluid substance consisting of polar molecules such as water molecules from a fluid stream containing polar and non-polar molecules.

20 Claims, 1 Drawing Sheet

MASS AND HEAT RECOVERY SYSTEM FOR A FUEL CELL POWER PLANT

TECHNICAL FIELD

The present invention relates to fuel cell power plants that are suited for usage in transport vehicles, portable power plants, or as stationary power plants, and the invention especially relates to a fuel cell power plant that recovers mass and heat, such as water vapor, exiting the plant and transfers the mass and heat back into the plant to enhance water balance and energy efficiency of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent the cathode. Porous water transport plates supply liquid water from a supply of coolant water to the anode electrode and remove water from the cathode electrode returning it back to the coolant water supply, and the plates thereby also serve to remove heat from the electrolyte and electrodes.

In operation of PEM fuel cells, it is critical that a proper water balance be maintained between a rate at which water is produced at the cathode electrode and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that, for efficient operation of the plant, enough water must be retained within the plant to offset water losses from gaseous streams of reactant and oxidant fluids passing through the plant. For example, any water exiting the plant through a cathode exhaust stream of gaseous oxidant or through an anode exhaust stream of gaseous reducing fluid must be balanced by water produced electrochemically at the cathode and retained within the plant.

A common approach to enhancing water balance is use of condensing heat exchangers downstream of power plant exhaust streams wherein the exhaust streams are cooled to a temperature at or below their dew points to precipitate liquid out of the exhaust streams so that the liquid may be returned to the power plant. An example of a PEM fuel cell power plant using a condensing heat exchanger is shown in U.S. Pat. No. 5,573,866 that issued on Nov. 12, 1996 to Van Dine et al., and is assigned to the assigneee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode electrode. Prior to entering the cathode housing, the same stream provides air as the oxidant for the cathode electrode, and upon leaving the chamber the stream includes evaporated product water and some portion of methanol, the reducing fluid, that has passed through the PEM. The condensing heat exchanger passes the cathode exhaust stream in heat exchange relationship with a stream of cooling ambient air, and then directs condensed methanol and water indirectly through a piping system back to an anode side of the cell.

While condensing heat exchangers have enhanced water balance and energy efficiency of fuel cell power plants, the heat exchangers encounter decreasing water recover efficiency as ambient temperatures increase. Where the power plant is to power a transportation vehicle such as an automobile, the plant will be exposed to an extremely wide range of ambient temperatures. For example where an ambient air coolant stream passes through a heat exchanger, performance of the exchanger will vary as a direct function of the temperature of the ambient air because decreasing amounts of liquid precipitate out of power plant exhaust streams as the ambient air temperature increases.

An additional complication of known fuel cell power plants designed for use in transportation vehicles is also related to fluctuations in ambient air conditions. Fuel cells of such plants typically utilize ambient air as the oxidant directed to the cathode electrode. Hot and dry ambient air increases a risk that the cathode electrode will dry out. Consequently, many efforts have been undertaken to prevent drying out of the cathode electrode and adjacent electrolyte especially in PEM fuel cells, including: directing liquid condensate from heat exchangers to humidify gaseous reactant and oxidant streams entering the cell; adding porous support layers and water transport plates in fluid communication with the electrodes for movement of coolant water through adjacent cells; and, generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell. Such efforts at maintaining efficient water balance involve additional cost, weight and volume, and often require complicated control apparatus.

Further problems of maintaining water balance in known fuel cell power plants are associated with components necessary to process hydrocarbon fuels, such as methane, natural gas, gasoline, diesel fuel, etc., into an appropriate reducing fluid that provides a hydrogen rich fluid to the anode electrode. Such fuel processing components of a fuel cell power plant typically include an auxiliary burner that generates steam; a steam duct into which the hydrocarbon fuel is injected; and a reformer that receives the steam and fuel mixture along with a small amount of a process oxidant such as air and transforms the mixture into a hydrogen-enriched reducing fluid appropriate for delivery to the anode electrode of the fuel cell. These fuel processing components also include water and energy requirements that are part of an overall water balance and energy requirement of the fuel cell power plant. Water made into steam in a steam generator of the auxiliary burner must be replaced by water recovered from the plant such as by condensing heat exchangers in the cathode exhaust stream and associated piping. Additionally, process oxidant streams that also support the auxiliary burner and reformer must be maintained within a stable humidity range to prevent variations in performance of those components. When the process oxidant streams for the fuel processing components are supplied by ambient air, humidifying the streams to stabilize performance of those fuel processing components further complicates maintenance of a self-sufficient water balance of such a fuel cell power plant.

Accordingly, known fuel cell power plants and plants that employ ambient air as the cathode oxidant or that employ ambient air for condensing heat exchangers and/or fuel processing components are incapable of maximizing an efficient water balance and minimizing operating energy requirements because of their above described characteristics. It is therefore highly desirable to produce a fuel cell power plant that achieves an efficient water balance for the entire plant and minimizes plant operating energy requirements.

DISCLOSURE OF THE INVENTION

The invention is a mass and heat recovery system for a fuel cell power plant. The system includes at least one fuel cell, hydrocarbon fuel processing components for producing hydrogen rich reducing fluids for the fuel cell, and a direct mass and heat transfer device for recovering mass and heat such as water vapor leaving the plant and transferring the recovered mass and heat back into the plant. The fuel cell includes an electrolyte that has opposed first and second major surfaces, an anode electrode supported by a porous anode support layer in intimate contact with the first major surface and a cathode electrode supported by a porous cathode support layer in intimate contact with the second major surface. The porous anode support layer passes a hydrogen rich reducing fluid stream in contact with the anode electrode, and the porous cathode support layer passes a process oxidant stream such as air in contact with the cathode electrode to provide oxidant to the cathode electrode and to sweep away by evaporation and entrainment into a cathode exhaust stream product water formed at the cathode along with water carried through the electrolyte from the anode electrode or any humidification water in the oxidant stream. The fuel processing components include an auxiliary burner that provides heat to generate steam and a reformer that receives the steam mixed with a hydrocarbon fuel along with a small amount of air and converts the mixture to a hydrogen rich stream appropriate for supplying hydrogen to the anode electrode.

The direct mass and heat transfer device passes the process oxidant stream upstream of the plant in mass transfer relationship with a plant exhaust stream that includes both the cathode exhaust stream and an anode exhaust stream wherein the anode exhaust stream has been directed through the auxiliary burner so that mass and heat such as water vapor in the plant exhaust stream transfer directly through a mass transfer medium of the mass transfer device to the process oxidant stream entering the plant. The direct mass and heat transfer device includes a separator housing for supporting the transfer medium in mass transfer relationship with the process oxidant stream and the power plant exhaust streams so that the streams contact the transfer medium and the separator housing prevents bulk mixing of the streams. The transfer medium may comprise any of a variety of materials for sorbing a fluid substance consisting of polar molecules such as water molecules from a stream containing fluid substances consisting of polar and non-polar molecules. An exemplary transfer medium includes a liquid water portion of a water saturated polyflourosulfonic ionomer membrane. In a preferred embodiment, the direct mass and heat transfer device recovers mass and heat from the cathode and anode exhaust streams and transfers the mass and heat into process oxidant streams for the cathode electrode and for the fuel processing components. In a further preferred embodiment, the electrolyte of the fuel cell is a proton exchange membrane ("PEM").

In use of the mass and heat recovery system for a fuel cell power plant, because the mass transfers directly from the cathode and anode exhaust stream into the process oxidant stream entering the power plant, a rate of uptake of the mass and therefore heat by the oxidant stream is not solely a function of ambient air temperature or humidity, but instead is a function of partial pressure differences between mass in the oxidant stream entering the power plant and the mass in the plant exhaust stream exiting the plant. The present invention therefore permits greater water recovery than is possible with a plant using an ambient air cooled condensing heat exchanger which has a water recovery rate that is largely a function of ambient temperatures. With the present invention, if ambient air temperature increases, a required heat transfer from the cathode and anode exhaust streams to the entering oxidant streams for optimal plant efficiency decreases, however a mass transfer capacity of the direct transfer device remains constant. Additionally, complex, heavy and costly condensing heat exchange components and related control apparatus are not needed, thereby increasing water balance and energy efficiency of the plant while decreasing weight, volume and cost.

Accordingly, it is a general object of the present invention to provide a mass and heat recovery system for a fuel cell power plant that overcomes deficiencies of prior art fuel cell power plants.

It is a more specific object to provide a mass and heat recovery system for a fuel cell power plant that is self-sufficient in water over a broad range of operating conditions.

It is yet another object to provide a mass and heat recovery system for a fuel cell power plant that returns to the plant water and heat exiting the plant without utilizing a condensing heat exchanger.

It is still a further object to provide a mass and heat recovery system for a fuel cell power plant that directly transfers mass and heat exiting the power plant back into plant process oxidant streams to humidify and heat those oxidant streams.

It is yet another specific object to provide a mass and heat recovery system for a fuel cell power plant that recovers water exiting the plant in cathode and anode exhaust streams to provide water to components for processing hydrocarbon fuels utilized by the plant.

These and other objects and advantages of this invention will become more readily apparent when the following description is read in conjunction with the accompanying drawing.

DESCRIPTION OF THE PREFERRED EMBODIMENTS

Figure 1:
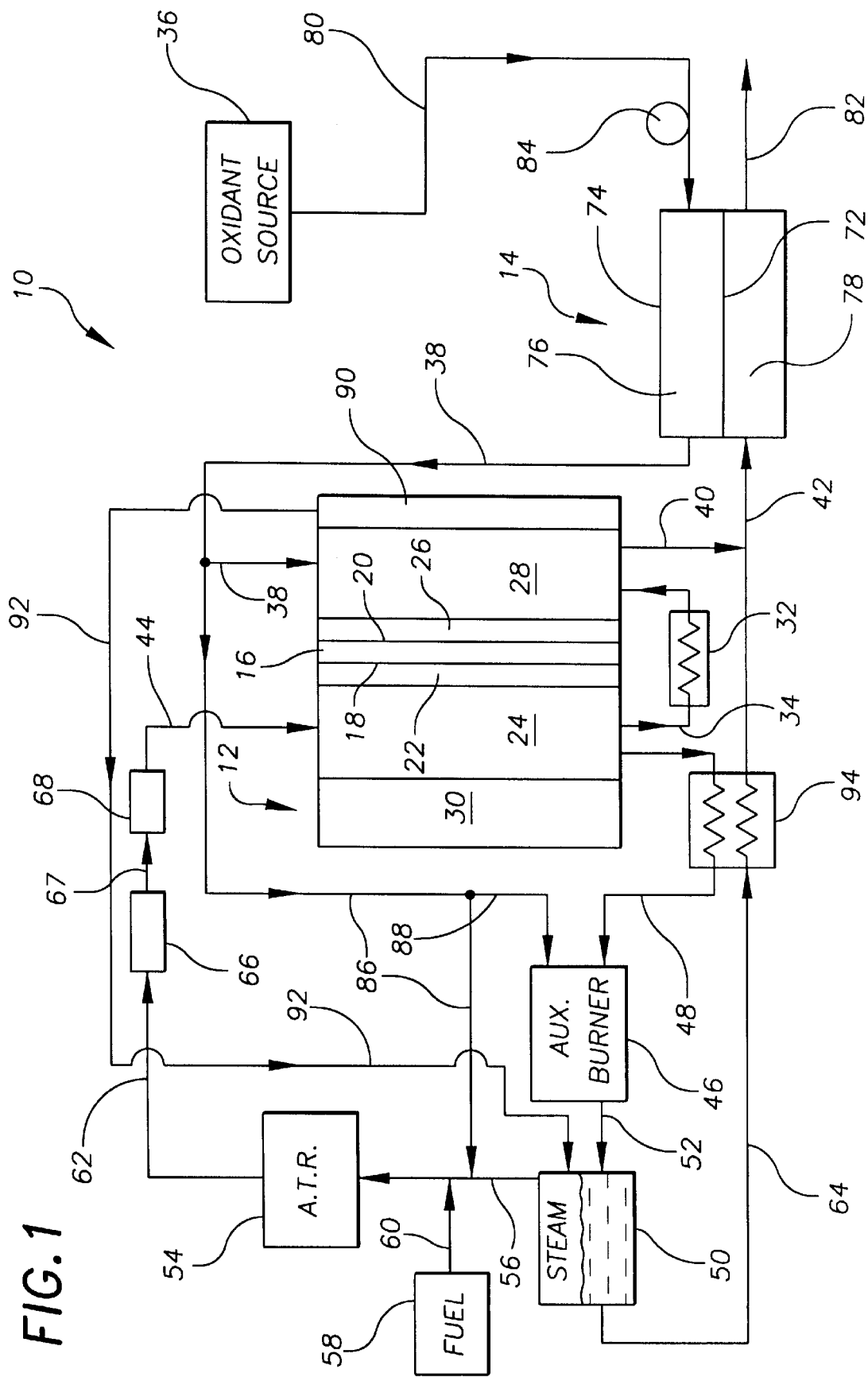
FIG. 1 is a schematic representation of a mass and heat recovery system for a fuel cell power plant constructed in accordance with the present invention.

Referring to the drawing in detail, a mass and heat recovery system for a fuel cell power plant of the present invention is shown and generally designated by the reference numeral 10. The system 10 includes at least one fuel cell 12 and a direct mass and heat transfer device 14. The fuel cell 12 includes an electrolyte 16 such as a proton exchange membrane ("PEM") or an acid or base electrolyte having a first major surface 18 and an opposed second major surface 20; an anode electrode 22 supported by a porous anode support layer 24 in intimate contact with the first major surface 18 of the electrolyte 16; and, a cathode electrode 26 supported by a porous cathode support layer 28 in intimate contact with the second major surface 20 of the electrolyte 16. The anode and cathode porous support layers 24, 28 may be formed of porous or channeled graphite, carbon or metal sheets. The fuel cell 12 may be combined with other virtually identical fuel cells in a well-known manner to form a stack. As is common in the art, the fuel cell 12 may be enclosed within a frame or structure 30 that defines manifolds for directing streams of reducing fluids and oxidants into and out of the cell, and the structure 30 also includes electrical conduction means for directing an electrical current generated by the fuel cell out of the cell 12 to an electricity using device 32, such as through a standard external load circuit 34.

A process oxidant or oxidant inlet stream such as air is directed from an oxidant source 36 into the fuel cell 12 through a primary oxidant passage 38 that passes a stream of oxidant into the porous cathode support layer 28 so that the oxidant passes in contact with the cathode electrode 26 to provide oxidant to the electrode 26 for facilitating an electrochemical reaction at the cathode electrode and for sweeping into the oxidant stream by evaporation and/or entrainment water formed at the cathode electrode 26 as well as water carried through the electrolyte 16 from the anode electrode 22 or any humidification water in the oxidant stream. The process oxidant stream then passes out of the cathode support layer 28 as a cathode exhaust stream within a cathode exhaust passage 40 and is then directed from the cathode exhaust passage into a plant exhaust passage 42. A reducing fluid stream is directed through a reducing fluid inlet 44 into the porous anode support layer 24 so that the reducing fluid such as hydrogen comes into contact with the anode electrode 22. In a well-known manner, the reducing fluid electrochemically reacts at the anode electrode to produce protons and electrons, wherein the electrons flow through the external load circuit 34 to power the electrical device 32 such as electric motors powering a transport vehicle, while the protons travel through the electrolyte 16 to the cathode electrode 26. The electrons then continue through the circuit 34 to the cathode electrode where they react with the oxidant to form water and heat.

The mass and heat recovery system for a fuel cell power plant 10 includes fuel processing component means for processing hydrocarbon fuels into reducing fluids appropriate for providing fuel to an anode electrode of a fuel cell. Exemplary hydrocarbon fuels for powering such a plant 10 include gasoline, diesel fuel, butane, propane, natural gas, methanol, ethanol, etc. The fuel processing component means may include: an auxiliary burner 46 (labelled "AUX. BURNER" in FIG. 1 for convenience) that burns a fuel including any excess reducing fluid such as hydrogen fed to the burner 46 as an anode exhaust stream through an anode exhaust passage 48 from the anode support layer 24; a steam generator 50 (labelled "STEAM" in FIG. 1) that receives heat directly from the burner 46 in a heat conduit 52 to generate steam from a supply of water; a reformer 54 that may be an autothermal reformer (labelled "A.T.R." in FIG. 1) that receives steam from the steam generator 50 mixed with the hydrocarbon fuel through steam line 56; a hydrocarbon fuel supply source 58 (labelled "FUEL" in FIG. 2) that supplies the fuel to the steam line through fuel line 60; a reformed fuel discharge line 62 that directs the reformed fuel from the reformer 54 into the reducing fluid inlet 44; and a burner exhaust passage 64 that directs the anode exhaust stream from the auxiliary burner 46 to the plant exhaust passage 42.

Any unused hydrogen rich reducing fluid in the anode exhaust stream is ignited in the auxiliary burner 46 to increase heat generated by the 46 burner and to thereby render the anode exhaust stream leaving the burner 46 within the burner and plant exhaust passages 64, 42 non-flammable as well as to maximize water generation. The ignited anode exhaust stream combines with the cathode exhaust stream in the plant exhaust passage 42 to become a plant exhaust stream. The fuel processing component means may also include components that are well-known in conventional steam reforming, autothermal reforming of various chemical compounds, and partial oxidation reforming, all of which include a reformer component. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received in the fuel-steam mixture to reach temperatures approximating 1,700 degrees fahrenheit (hereafter "°F."). Additional fuel processing component means may include a water shift reactor 66 connected by line 67 to a selective oxidizer 68, both of which are secured in fluid communication between the reformed fuel discharge line 62 and the reducing fluid inlet 44 in order to minimize carbon monoxide levels in the reducing fluid stream entering the anode support layer 24, as is well-known in the art.

The direct mass and heat transfer device 14 is secured in fluid communication with both the primary oxidant passage 38 and the plant exhaust passage 42. The direct mass and heat transfer device 14 includes a transfer medium means 72 for sorbing a fluid substance consisting of polar molecules within a first fluid stream containing fluid substances consisting of polar and non-polar molecules, such as a stream including water vapor and/or entrained liquid moisture (being a fluid substance consisting of polar molecules) and air (being a fluid substance consisting of non-polar molecules), and for desorbing the sorbed fluid into a second stream having a lower proportion of the fluid substance consisting of polar molecules than the first stream. Exemplary transfer medium means include a liquid water portion of an ion exchange resin or an ionomeric membrane such as a water saturated polyflourosulfonic ionomer membrane sold under the brand name "NAFION" by the E.I. DuPont company of Willmington, Del., U.S.A., or a liquid water portion of tubes made of the aforesaid "NAFION" membrane and sold under the brand name "ME-SERIES MOISTURE EXCHANGERS" by the Perma Pure, Inc. company of Toms River, N.J., U.S.A. An additional transfer medium includes a desiccant material capable of sorbing moisture from a gaseous stream and capable of desorbing the moisture into a gaseous stream such as finely powdered solid, crystalline alkali metal or alkaline earth metal compounds including active carbons, silica gel, activated aluminas and zeolites as described in more detail at Column 5, line 9 to Column 6, line 17 in U.S. Pat. No. 5,542,968 issued on Aug. 6, 1996 to Belding et al., which patent is hereby incorporated herein by reference.

The direct mass transfer device 14 also includes a separator housing means 74 for supporting the transfer medium means 72 in mass transfer relationship with the plant exhaust stream and the process oxidant stream so that both streams contact the mass transfer medium means and the separator housing means prevents bulk mixing of the plant exhaust and process oxidant streams. Exemplary separator housing means may include an enclosure (shown schematically in FIG. 1 reference number 74) that supports the transfer medium means 72 between an inlet chamber 76 and an exhaust chamber 78. The process oxidant stream passes from the oxidant source 36 through an oxidant feed line 80 into and through the inlet chamber 76 into the primary oxidant passage 38, while the plant exhaust stream passes from the plant exhaust passage 42 into and through the exhaust chamber 78 to leave the plant 10 through a plant discharge vent 82 in fluid communication with the exhaust chamber 78. Additional separator housing means 74 may include more complicated enclosures structured to enhance exposure of the process oxidant and plant exhaust streams to the mass transfer medium means while preventing bulk mixing of the streams such as enclosures common in known fluid to fluid heat exchanger art. An additional and cooperative aspect of the separator housing means 74 includes membrane portions supporting liquid water portions in the aforesaid "NAFION" membrane materials and tube portions supporting liquid water in the aforesaid "NAFION"-based tubes that are sold under the brand name "ME-SERIES MOISTURE EXCHANGERS" by Perma Pure, Inc. In such a separator housing means 74, "NAFION"-based mass transfer medium means will selectively transfer fluid substances consisting of polar molecules such as water vapor or entrained liquid moisture from a side of the membrane having a greatest concentration of the fluid substances consisting of polar molecules to a side having a lesser concentration in a manner well-known in the art.

A further exemplary separator housing means includes an enthalpy wheel that supports the aforesaid desiccant transfer medium means in a rotational disposition between a moisture laden plant exhaust stream and a dry process oxidant stream, as described in more detail at Column 4, line 35 to Column 5, line 4 and generally throughout the aforesaid U.S. Pat. No. 5,542,968. The wheel includes a plurality of open ended passages running generally parallel to an axis of rotation of the wheel, wherein the passages are typically formed by winding a flat sheet of corrugated paper board including the mass transfer medium desiccant around a central hub of the wheel until a multi-layered media is built up that extends to an outer housing of a cassette supporting the wheel. Such enthalpy wheels are well-known in building air-conditioning arts, as further described in U.S. Pat. No. 5,660,048 that issued on Aug. 26, 1997 to Bedding et al. and is incorporated herein by reference. As a separator housing means, the enthalpy wheel would be supported to rotate about an axis parallel to flow through the inlet and exhaust chambers 76, 78 so that the plant exhaust stream passes through about one-half of the wheel while simultaneously the process oxidant stream passes through the other half of the wheel. The transfer medium means desiccant on a first portion of the wheel within the exhaust chamber 78 would thereby sorb a fluid substance consisting of polar molecules such as water vapor or entrained liquid moisture from the plant exhaust stream and, when the wheel rotates to position that first portion of the wheel into the inlet chamber 76, if the concentration of the fluid substance consisting of polar molecules within the inlet oxidant stream is less that the concentration of the fluid substance consisting of fluid molecules within the plant exhaust stream, the sorbed polar molecule fluid substance held by the desiccant would be desorbed into the process oxidant stream to humidify and heat the oxidant stream.

As shown in FIG. 1, the direct mass transfer fuel cell power plant 10 may also include a blower 84 positioned on the oxidant feed line 80 to variably accelerate flow of gaseous oxidant into the plant 10. Optionally, the blower 84 may be positioned along the primary oxidant passage 38 for the same purposes.

As seen in FIG. 1, where the plant 10 includes the above-described fuel processing components, the primary oxidant passage 38 that supplies the oxidant stream to the cathode support layer may be split to include a secondary oxidant passage 86 that directs a portion of the process oxidant stream into the fuel processing component means such as into the steam line 56 to become process oxidant for the autothermal reformer 54 so that a portion of the mass and heat such as water vapor recovered from the plant exhaust into the oxidant stream by the mass transfer device 14 is directed into the steam and fuel mixture entering the autothermal reformer. In that manner, the overall heat and steam requirements of the auxiliary burner 46 and steam generator 50 are lessened.

To further support the fuel processing components, the primary oxidant passage 38 may be further split to include a tertiary oxidant passage 88 that directs a portion of the process oxidant stream into the auxiliary burner 46 to become process oxidant for the burner 46 thereby directing some of the mass and heat such as water vapor transferred from the plant exhaust stream by the mass transfer device 14 into the burner 46 to improve efficiencies of the mass and heat transfer device and direct water recovered from the plant exhaust stream back into the plant 10 to effectively supplement water within the steam generator 50 and enhance water self-sufficiency of the plant 10.

The mass and heat recovery system for a fuel cell power plant 10 may also include a coolant water loop means for recycling water recovered from the fuel cell 12 to the fuel processing components to further enhance plant water self-sufficiency. The coolant water loop means includes a fine pore water plate 90 adjacent the cathode support layer 28 that sorbs water formed at the cathode electrode and/or water passing through the electrolyte 16; and a coolant water line 92 that directs water in the fine pore water plate 90 into the fuel processing component means such as into the steam generator 50 to further supplement the water supply of the steam generator. As can be seen in FIG. 1, some of that water then passes through the steam line 56 into the autothermal reformer 54, and from there through the reformed fuel discharge line 62 and reducing fluid inlet 44 back into the anode support layer 24, and may then pass through the electrolyte 16 and back into the fine pore water plate 90 to complete a "loop" of the coolant water loop means. The coolant water loop means may also include a fine pore water plate adjacent the anode support layer 24, and in such a sequence between each cell in a stack, as shown in more detail in U.S. Pat. No. 5,505,944 that issued on Apr. 26, 1996 to Meyer et al., which patent is owned by the assignee of the present invention and which patent is hereby incorporated herein by reference. The mass and heat recovery system for a fuel cell power plant 10 may also include a heat exchanger 94 disposed to direct the anode exhaust passage 48 in heat exchange relationship with the burner exhaust passage 64 to pass heat from the anode exhaust stream passing through the burner exhaust passage 64 into the anode exhaust stream passing through the anode exhaust passage 48 and thereby further minimize heat loss from the plant 10. Additional heat exchangers may be utilized in the plant in a manner well-known in the art to minimize heat loss from the plant.

A design estimate of performance of the mass and heat recovery system for a fuel cell power plant of the present invention produces data that demonstrates substantial advantages over comparable fuel cell power plants that do not employ the system of the present invention. The design estimate utilizes as a direct mass and heat transfer device an enthalpy wheel as a separator housing with the above-described desiccant transfer medium secured to the enthalpy wheel. The enthalpy wheel is secured so that the plant exhaust stream passes through one-half of the wheel to be in mass transfer relationship with the process oxidant stream that passes through the other half of the wheel as the wheel rotates between an inlet chamber that directs the process oxidant stream through the wheel and an exhaust chamber that directs the plant exhaust stream through the wheel. The enthalpy wheel is dimensioned to transfer 160 pounds of water per hour. A process oxidant stream enters the inlet chamber 76 of the direct mass and heat transfer device 14 at approximately 77 degrees fahrenheit ("°F.") and then leaves the device at approximately 147° F. and at a flow rate of about 1,050 pounds per hour. A burner exhaust stream within the burner exhaust passage 64 is about 515° F. and is cooled to about 194° F. within the plant exhaust passage 42 where it mixes with a cathode exhaust stream to become a plant exhaust stream at a flow rate of about 1,260 pounds per hour. It then enters the exhaust chamber of the direct mass and heat transfer device 14 to pass in mass transfer relationship with the process oxidant stream, and then leaves the device 14 at approximately 151° F. to leave the plant through the plant discharge vent 82. This design estimate demonstrates substantially improved performance of the mass and heat recovery system for a fuel cell power plant compared to known plants using no recovery systems or plants using condensing heat exchangers to recover mass and heat.

While the present invention has been described and illustrated with respect to a particular construction and method of use of the mass and heat recovery system for a fuel cell power plant, it is to be understood that the present invention is not to be limited to the described and illustrated embodiments. For example, while reference has been made to a fuel cell having a PEM as an electrolyte, it to be understood that any electrolyte that is capable of usage within fuel cells may be employed in the fuel cell power plant of the present invention. Accordingly, reference should be made primarily to the following claims rather than the foregoing description to determine the scope of the invention.

What is claimed is:

1. A mass and heat recovery system for a fuel cell power plant that generates electrical energy from a reducing fluid and an oxidant fluid, the plant comprising:
   a. at least one fuel cell means for producing the electrical energy from the reducing and oxidant fluids;
   b. fuel processing component means for processing a hydrocarbon into the reducing fluid including an auxiliary burner that receives and burns an anode exhaust stream from the fuel cell and directs the anode exhaust stream into a plant exhaust passage;
   c. a primary oxidant passage that passes a process oxidant stream from a supply of oxidant into the fuel cell means;
   d. a cathode exhaust passage that passes a cathode exhaust stream out of the fuel cell means and into the plant exhaust passage wherein the cathode exhaust stream mixes with the burned anode exhaust stream into a plant exhaust stream; and,
   e. a direct mass and heat transfer device secured in fluid communication with the primary oxidant passage and with the plant exhaust passage, including;
      i. a transfer medium means for sorbing a fluid substance consisting of polar molecules within the plant exhaust stream and for desorbing the fluid substance consisting of polar molecules into the process oxidant stream; and ii. a separator housing means for supporting the transfer medium means in mass transfer relationship with the plant exhaust stream and process oxidant stream so that both streams contact the mass transfer medium means, and for preventing bulk mixing of the plant exhaust and process oxidant streams.

2. The system of claim 1, wherein the transfer medium means comprises a liquid water portion of an ionomeric membrane.

3. The system of claim 2, wherein the separator housing means comprises membrane portions supporting the liquid water of the ionomeric membrane.

4. The system of claim 1, wherein the transfer medium means comprises a liquid water portion of ionomeric membrane tubes.

5. The system of claim 4, wherein the separator housing means comprises tube portions supporting the liquid water in the ionomeric membrane tubes.

6. The system of claim 1, wherein the transfer medium means comprises a desiccant material capable of sorbing moisture from a gaseous stream and capable of desorbing moisture into a gaseous stream.

7. The system of claim 6, wherein the separator housing means comprises an enthalpy wheel supporting the desiccant material in a plurality of passages running generally parallel to an axis of rotation of the enthalpy wheel and the enthalpy wheel is rotationally supported within inlet and exhaust chambers of the separator housing so that the wheel rotates about an axis parallel to flow of the process oxidant stream through the inlet chamber and the plant exhaust stream through the exhaust chamber to directly transfer sorbed moisture from the exhaust stream to the process oxidant stream.

8. The system of claim 1, wherein the electrolyte is a proton exchange membrane.

9. A mass and heat recovery system for a fuel cell power plant that generates electrical energy from a reducing fluid and an oxidant fluid, the system comprising:
 a. at least one fuel cell, including;
  i. an electrolyte having a first major surface and an opposed second major surface; and
  ii. an anode electrode supported by a porous anode support layer in intimate contact with the first major surface of the electrolyte and a cathode electrode supported by a porous cathode support layer in intimate contact with the second major surface of the electrolyte, wherein the porous anode support layer passes a stream of the reducing fluid in contact with the anode electrode and the porous cathode support layer passes a stream of the oxidant fluid in contact with the cathode electrode;
 b. fuel processing component means for processing a hydrocarbon fuel into the reducing fluid including an auxiliary burner that receives and burns an anode exhaust stream from the fuel cell and directs the burned anode exhaust stream into a plant exhaust passage;
 c. a primary oxidant passage that passes a process oxidant stream from a supply of oxidant into the porous cathode support layer and a secondary oxidant passage that passes a portion of the process oxidant stream into the fuel processing component means as a process oxidant for the fuel processing component means;
 d. a cathode exhaust passage that passes a cathode exhaust stream out of the porous cathode support layer and into the plant exhaust passage wherein the cathode exhaust stream mixes with the burned anode exhaust stream into a plant exhaust stream; and,
 e. a direct mass and heat transfer device secured in fluid communication with the primary oxidant passage and with the plant exhaust passage, including;
  i. a transfer medium means for sorbing a fluid substance consisting of polar molecules within the plant exhaust stream and for desorbing the fluid substance consisting of polar molecules into the process oxidant stream; and
  ii. a separator housing means for supporting the transfer medium means in mass transfer relationship with the plant exhaust stream and process oxidant stream so that both streams contact the mass transfer medium means, and for preventing bulk mixing of the plant exhaust and process oxidant streams.

10. The system of claim 9, wherein the fuel processing component means further comprises a steam generator that receives heat from the auxiliary burner to generate steam, a reformer that receives steam from the steam generator mixed with the hydrocarbon fuel through a steam line between the steam generator and the reformer, a supply source of the hydrocarbon fuel that feeds the hydrocarbon fuel into the steam line, and a reformed fuel discharge line that directs the reformed fuel into the anode support layer, and wherein the secondary oxidant passage directs a portion of the process oxidant stream into the steam line.

11. The system of claim 10, wherein the plant includes a tertiary oxidant passage in fluid communication with the direct mass and heat transfer device that passes a portion of the process oxidant stream into the auxiliary burner.

12. The system of claim 11, wherein the transfer medium means comprises a liquid water portion of an ionomeric membrane and the separator housing means comprises membrane portions supporting the liquid water of the ionomeric membrane.

13. The system of claim 11, wherein the transfer medium means comprises a liquid water portion of ionomeric membrane tubes and the separator housing means comprises tube portions supporting the liquid water in the ionomeric membrane tubes.

14. The system of claim 11, wherein the transfer medium means comprises a desiccant material capable of sorbing moisture from a gaseous stream and capable of desorbing moisture into a gaseous stream.

15. The system of claim 14, wherein the separator housing means comprises an enthalpy wheel supporting the desiccant material in a plurality of passages running generally parallel to an axis of rotation of the enthalpy wheel and the enthalpy wheel is rotationally supported within inlet and exhaust chambers of the separator housing so that the wheel rotates about an axis parallel to flow of the process oxidant stream through the inlet chamber and the plant exhaust stream through the exhaust chamber to directly transfer sorbed moisture from the plant exhaust stream to the process oxidant stream.

16. The system of claim 9, wherein the electrolyte is a proton exchange membrane.

17. A method of operating a fuel cell power plant for recovery of mass and heat exiting the plant, the method comprising the steps of:
 a. providing at least one fuel cell, including;
  i. an electrolyte having a first major surface and an opposed second major surface; and
  ii. an anode electrode supported by a porous anode support layer in intimate contact with the first major surface of the electrolyte and a cathode electrode supported by a porous cathode support layer in intimate contact with the second major surface of the electrolyte, wherein the porous anode support layer passes a stream of the reducing fluid in contact with the anode electrode and the porous cathode support layer passes a stream of the oxidant fluid in contact with the cathode electrode;

b. passing a process oxidant stream through a primary oxidant passage from a supply of oxidant into the porous cathode support layer;

c. passing an anode exhaust stream from the anode support layer through an auxiliary burner fuel processing component, burning the anode exhaust stream and directing the burned anode exhaust stream into a plant exhaust passage;

d. passing a cathode exhaust stream through a cathode exhaust passage out of the porous cathode support layer into the plant exhaust passage and mixing the burned anode exhaust stream with the cathode exhaust stream into a plant exhaust stream; and, e. directing the process oxidant stream and plant exhaust stream in mass transfer relationship within a direct mass and heat transfer device by passing the process oxidant stream and plant exhaust stream in contact with a transfer medium for sorbing a fluid substance consisting of polar molecules within the plant exhaust stream and for desorbing the fluid substance consisting of polar molecules into the process oxidant stream by further supporting the mass transfer medium within a separator housing so that both streams contact the mass transfer medium and both streams are prevented from bulk mixing together.

18. The method of claim 17, further comprising the step of passing a portion of the process oxidant stream through a secondary oxidant passage into fuel processing components of the plant as a process oxidant for the fuel processing components.

19. The method of claim 18, further comprising the step of passing a portion the process oxidant stream through the secondary oxidant passage into a steam line providing steam and hydrocarbon fuel to a fuel processing reformer of the plant and passing a portion of the process oxidant stream through a tertiary oxidant passage to the auxiliary burner providing heat to a steam generator of the plant.

20. The method claim 17, further comprising the step of directing the process oxidant stream and plant exhaust stream in mass transfer relationship by passing the process oxidant stream and plant exhaust stream in contact with a liquid water portion of an ionomeric membrane.

* * * * *